United States Patent
Jahromi

(10) Patent No.: US 9,383,166 B2
(45) Date of Patent: Jul. 5, 2016

(54) TELESCOPIC GUN SIGHT WITH BALLISTIC ZOOM

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

( * ) Notice: Subject to any disclaimer, the term of this patent is extended or adjusted under 35 U.S.C. 154(b) by 149 days.

(21) Appl. No.: 14/492,056

(22) Filed: Sep. 21, 2014

(65) Prior Publication Data

US 2016/0084616 A1    Mar. 24, 2016

(51) Int. Cl.
*F41G 1/30* (2006.01)
*F41G 1/38* (2006.01)
*G02B 23/00* (2006.01)
*G02B 23/24* (2006.01)
*G02B 7/10* (2006.01)

(52) U.S. Cl.
CPC .. *F41G 1/38* (2013.01); *G02B 7/10* (2013.01); *G02B 23/145* (2013.01); *G02B 23/2407* (2013.01)

(58) Field of Classification Search
USPC .................. 42/119, 122, 130; 89/41.19, 200; 33/297, 227; 356/399
See application file for complete search history.

(56) References Cited

U.S. PATENT DOCUMENTS

| | | | | |
|---|---|---|---|---|
| 4,561,204 A | * | 12/1985 | Binion | F41G 1/38 356/21 |
| 7,877,886 B1 | * | 2/2011 | Hamilton | F41G 1/12 33/297 |
| 8,286,384 B2 | | 10/2012 | Zaderey et al. | |
| 2011/0132983 A1 | * | 6/2011 | Sammut | F41G 1/38 235/404 |
| 2012/0055063 A1 | * | 3/2012 | Lindau | F41G 1/30 42/113 |

OTHER PUBLICATIONS

Zeiss Rapid-Z reticle User Manual, p. 10, Section 4. This manual can be obtained by contacting the manufacturer or on-line from www.zeiss.com. This reference mentions adjusting a multi-hold reticle to a given load by a small change in magnification. This is done only during zeroing-in and then zoom must be kept fixed in the field. This is radically different from the present invention.

* cited by examiner

*Primary Examiner* — J. Woodrow Eldred

(57) ABSTRACT

This invention teaches a telescopic gun sight wherein the sight's magnification and point of aim can be adjusted simultaneously using the zoom knob. Once the sight is zeroed-in at a set distance, say 100 yards, it will automatically compensate for bullet drop at longer distances as magnification is increased.

6 Claims, 7 Drawing Sheets

TELESCOPIC GUN SIGHT WITH BALLISTIC ZOOM

I. CROSS-REFERENCE TO RELATED APPLICATIONS

Not Applicable.

II. FIELD OF THE INVENTION

This application relates to optical gun sights, specifically to adjusting the point of aim in zoom telescopic gun sights.

III. BACKGROUND OF THE INVENTION

A telescopic gun sight or a riflescope is a device that provides an accurate point of aim for firearms such as rifles, handguns and shotguns. It is used with other types of weapons such as bows and crossbows as well. A telescopic sight can significantly improve the functionality of a firearm by providing the shooter with a simple yet highly accurate means for aiming at distant targets.

FIG. 1 shows a common optical layout for riflescopes. With reference to this figure, a riflescope is comprised of an objective lens 1 which forms a first image of the target on the objective focal plane 2. The first image produced by the objective lens is upside down and laterally reversed. An image-erecting means comprising a pair of lenses 3a and 3b relays this first image to the eyepiece focal plane 4 and forms a second, upright and laterally correct image there. An eyepiece lens 5 takes this second image and produces a virtual magnified image for the shooter to see.

Most modern riflescopes sold on the market today have variable magnification or "zoom" capability. With reference to FIG. 1, the magnification of the telescopic sight can be changed by changing the position of the relay lenses 3a and 3b. In this case, these lenses are commonly referred to as the "variator group". Most riflescopes used for hunting and sporting applications have a zoom ratio of 3× or 4×, although higher zoom ratios up to 8× have also being introduced.

In riflescopes, the "point of aim" is usually designated by a reticle or cross hairs. In FIG. 1, the reticle 20 is mounted coplanar with the eyepiece focal plane 4. However, it can also be mounted at the objective focal plane 2. In either case, the shooter will see an image of the reticle superimposed on the image of the target.

Telescopic sights are equipped with two control knobs for elevation (up-down) and windage (left-right) adjustments. These knobs mechanically move the reticle so that the sight's point of aim can be aligned with the firearm's "point of impact". The amount of adjustment is usually very small and is measured in minutes of angle (MOA) or milliradians. The adjustment mechanism is shown in FIG. 2. With reference to this figure, the image-erecting lenses 3a and 3b are mounted inside an inner tube 6. The rear end of this inner tube is attached to the main riflescope housing 30 via a hinge 37. This hinge is such that the inner tube 6 can tilt in both vertical and horizontal directions (FIG. 2 is a side-view so it only shows vertical tilt). The front end of the inner tube 6 is held in position by an adjustable knob 38 and a support leaf spring 9. The shooter can adjust the apparent position of the reticle 20 on the target image by adjusting the knob 38. The advantage of this mechanism is that the shooter always sees the reticle at the center of his field of view no matter how much the point of aim is shifted to adjust for windage and elevation.

To aim at targets located at various distances, the shooter must compensate for bullet drop. This is due to the fact that the bullet will begin to respond to the effects of gravity the instant it is free from the mechanical constraints of the bore. Bullet drop is defined as the vertical distance of the projectile below the line of departure from the bore. For hitting a distant target an appropriate positive elevation angle is required that is achieved by angling the line of sight from the shooter's eye through the centerline of the telescopic sight downward toward the line of departure. This can be accomplished by adjusting the sight's elevation knob. However, this is not an easy task to do in the field due to several reasons:

The elevation adjustment knobs often provide adjustment values at very small steps, usually 0.25 MOA or 0.1 miliradian per click. This makes it difficult to adjust for targets at long distances since many clicks would be required to compensate for bullet trajectory.

The mechanical elevation adjustment mechanism described above utilizes the tension of a spring 9 to hold the erector lens tube 6. As a result, repeated elevation adjustments can cause a shift in the sight's original point of aim.

The present application teaches a novel method for bullet drop compensation in zoom telescopic gun sights. The telescopic sight is designed such that the point of aim can be adjusted simply by adjusting the zoom knob. A key advantage of this invention is that the shooter does not need to make two adjustments to his scope (zoom and elevation) to shoot at a distant target. As he naturally increases the magnification (zoom), the scope automatically adjusts its point of aim for a longer distance. Other benefits and advantages of the invention are presented in Section VI-D.

IV. SUMMARY OF THE INVENTION

In this invention, a reticle which is mounted at a vertical offset with respect to the optical axis of the erector lenses is used to make the point of aim dependent on magnification. It is shown that by choosing a proper value for the vertical offset, a zoom riflescope can provide sufficient elevation adjust to compensate for bullet drop at various field ranges.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

FIGS. 5(a)-(d) illustrate how an offset reticle provides bullet-drop compensation during zoom as described in Example 1.

Figure 6:

FIG. 6 shows the angular adjustment required to compensate for the trajectory of a .300 Winchster Magnum rifle as described in Example 2.

Figure 7:
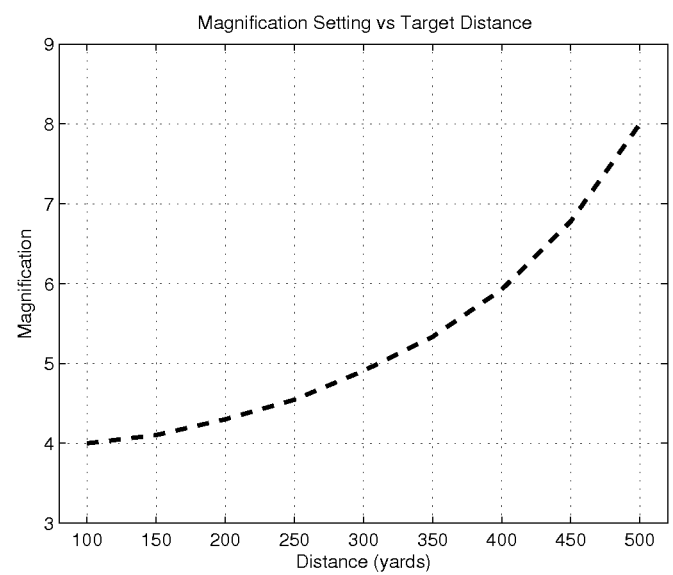

FIG. 7 shows the proper zoom setting to compensate for the trajectory of a .300 Winchester Magnum rifle as described in Example 2.

Figure 8:
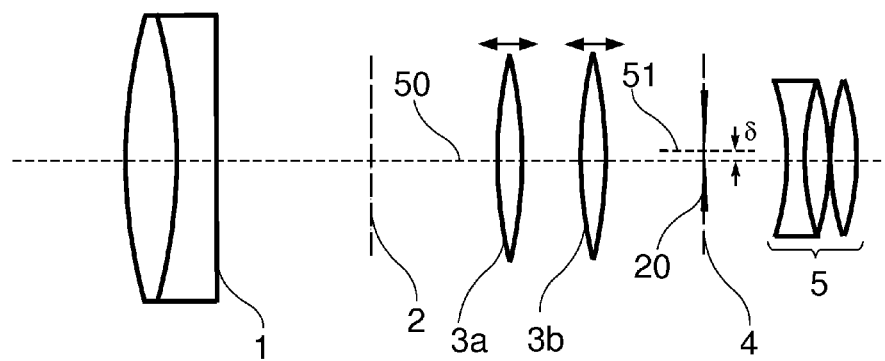

FIG. 8 is a side view schematic depicting the arrangement of optical elements in a first embodiment of the invention.

Figure 9:
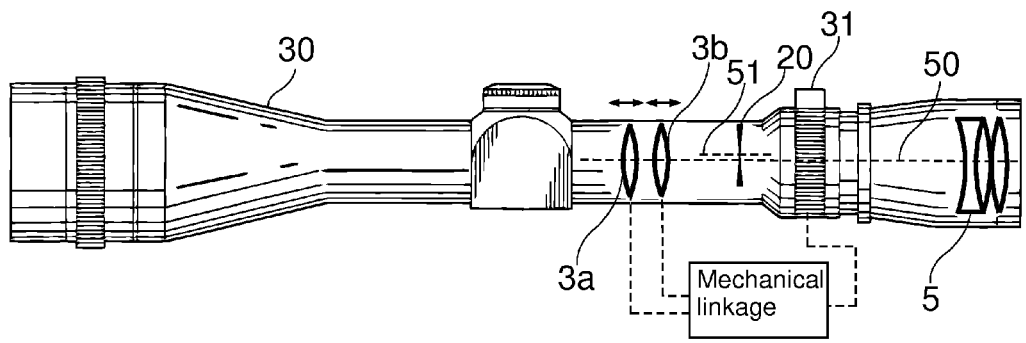

FIG. 9 is a side view schematic depicting housing and mechanical linkage means according to the first embodiment of the invention.

Figure 10:
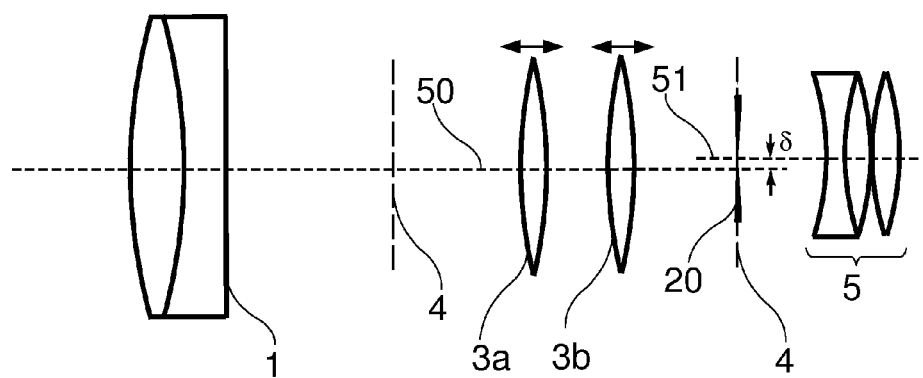

FIG. 10 is a side view schematic depicting the arrangement of optical elements in a second embodiment of the invention.

Figure 11:
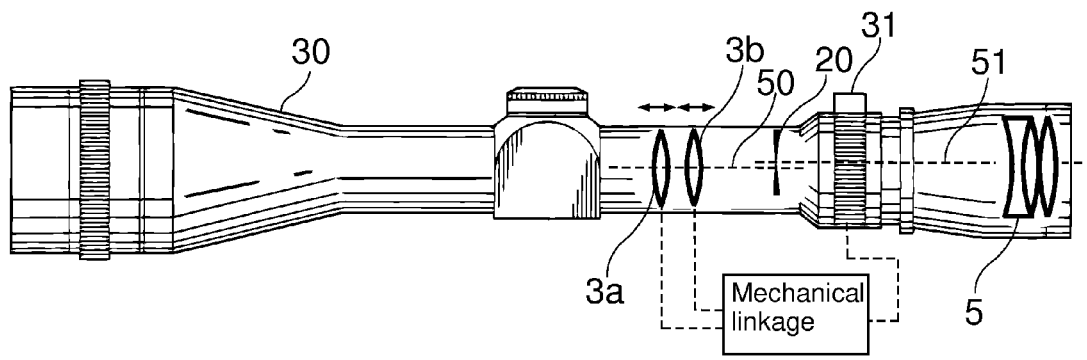

FIG. 11 is a side view schematic depicting housing and mechanical linkage means according to the second embodiment of the invention.

Figure 12:
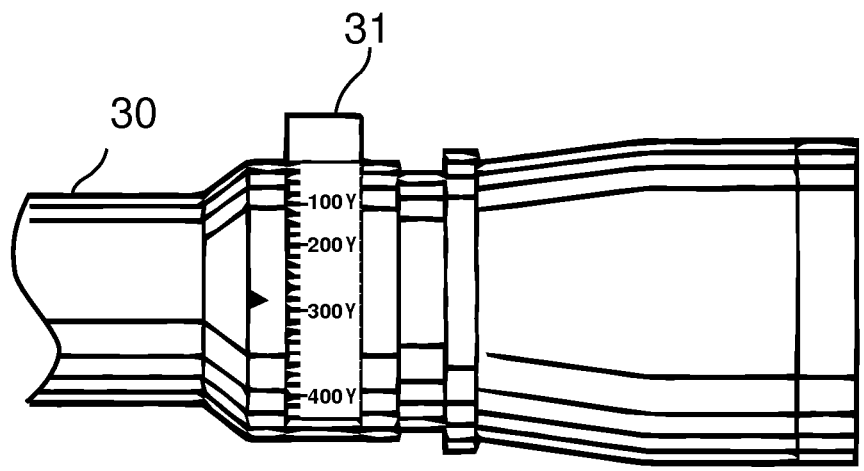

FIG. 12 shows the zoom knob being furnished with distance markings as described in the invention.

Figure 13:
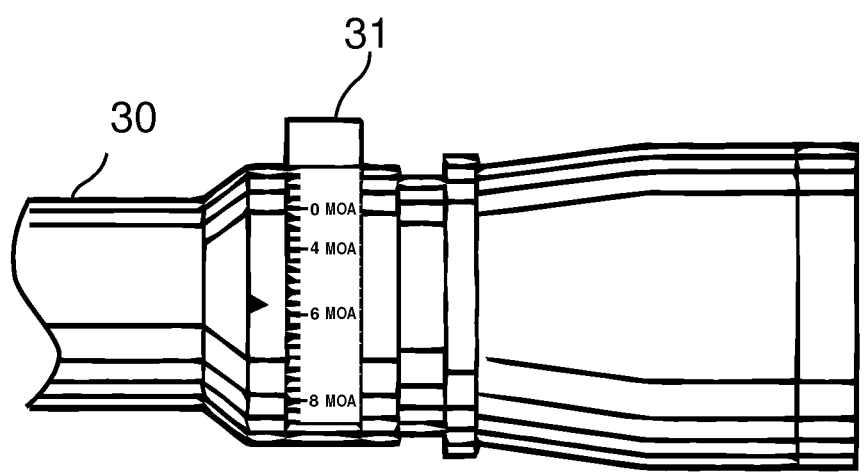

FIG. 13 shows the zoom knob being furnished with bullet drop markings in minutes of angle as described in the invention.

VI. DETAILED DESCRIPTION OF THE INVENTION

A. Principle of Operation

Figure 3:
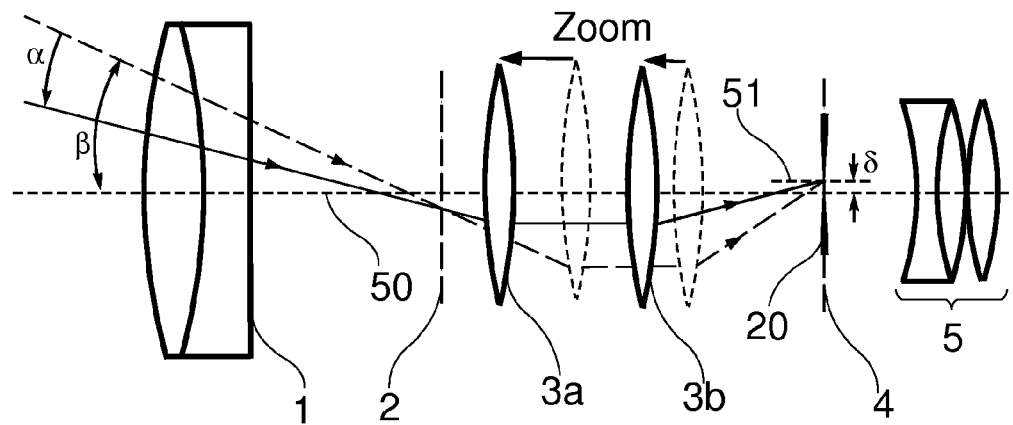
FIG. 3 is a side view diagram showing how a reticle mounted at an offset position designates different points of aim as magnification changes.

Consider the optical diagram shown in FIG. 3. This diagram shows a zoom telescopic sight where the reticle 20 is mounted at the eyepiece focal plane 4. In this case, the reticle is located after the variator group lenses and the image of the target formed on it will enlarge when the sights's magnification is increased. With increased magnification, the actual field of view of the telescopic sight decreases. As a result, the field angle associated with any image point on the eyepiece focal plane located away from the center of the image also decreases.

A novel aspect of the telescopic sight shown in FIG. 3 is that the reticle 20 is positioned such that its aiming center represented by the axis 51 is positioned above the optical axis 50 of the variator group lenses 3a and 3b. The vertical offset $\delta$ between the aiming center of the reticle and the center of the image formed by the variator group lenses makes the relative position of the reticle on the target dependent on magnification. More generally, the image point specified by the aiming center of the reticle corresponds to a field angle which depends on both the vertical offset $\delta$ and the sight's magnification $z$. We use the Greek letter $\beta$ to denote this field angle when the sight is set to its lowest magnification $z_{min}$. The point of aim will correspond to a field angle smaller than $\beta$ at higher magnifications. The change in the filed angle, denoted $\alpha$, for a specific magnification $z$ can be calculated from the following formula:

$$\frac{\alpha}{\beta} + \frac{z_{min}}{z} = 1 \quad (1)$$

Figure 4:
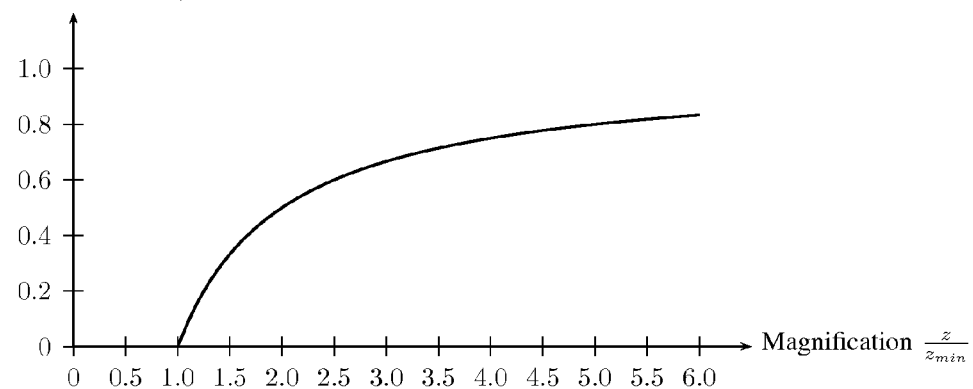
FIG. 4 is a plot showing the rate of change in elevation adjustment vs magnification.

FIG. 4 shows how the field angle change $\alpha$ is a function of magnification $z$. Note how $\alpha$ increases quickly with magnification initially but its rate of change is proportionally decreased at higher magnifications.

EXAMPLE 1

Consider a zoom riflescope with minimum magnification of 2× and maximum magnification of 12×. So, this riflescope has a 6× zoom ratio. Assume that the reticle is mounted at the eyepiece focal plane such that its aiming center (where the cross-hairs meet) is above the optical axis of the variator lens group. The vertical offset between the reticle aiming center and the variator group optical axis is chosen such that the point of aim corresponds to a field angle $\beta=12$ MOA above the optical axis of the riflescope at 2× magnification.

Figure 5A:
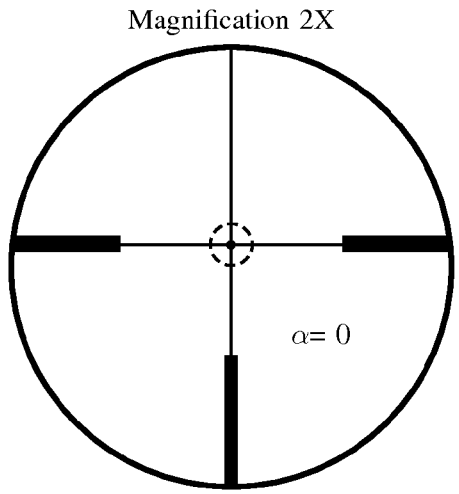
Figure 5B:
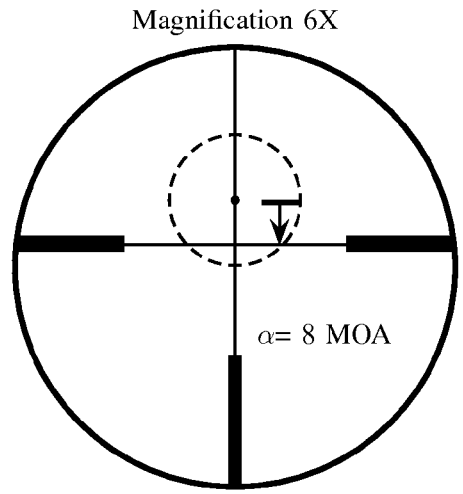
Figure 5C:
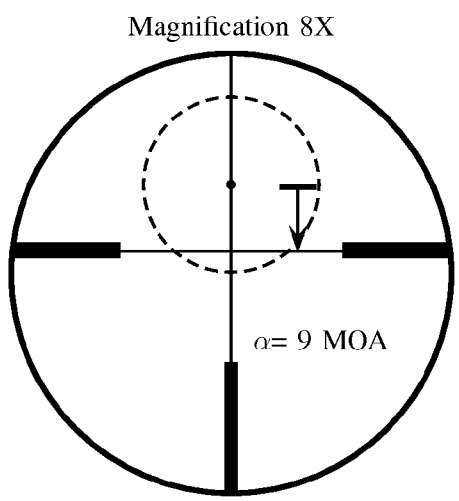
Figure 5D:
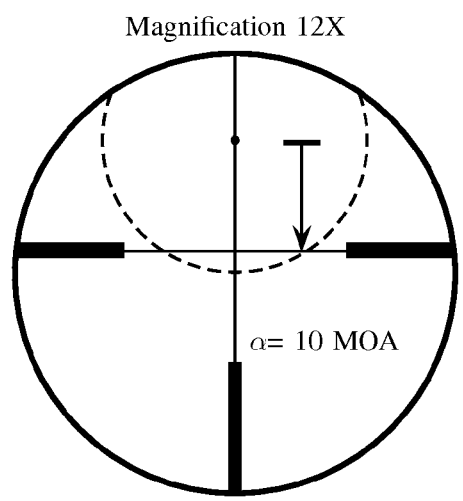

If we aim this riflescope at the center of a circular target, the image through the riflescope appears as shown in FIG. 5(a). In this figure, the target is represented by a dotted-line circle. If, without changing the direction of the riflescope, we increase the magnification to 6×, the target image will appear as shown in FIG. 5(b). At 6× magnification, the target circle appears three times larger. It also appears that the point of aim has moved 8 MOA downwards. If we increase the magnification further, the point of aim appears to move further down on the target corresponding to shifts of 9 MOA at 8× and 10 MOA at 12×, respectively. The apparent shift in the point of aim is shown in FIGS. 5(c) and (d).

The above example illustrates how an offset reticle can make the point of aim appear to move downward on the target when the sight's magnification is changed. In this invention we use this feature of an offset reticle to design a telescopic gun sight that automatically compensates for bullet drop via its zoom setting. The following example illustrates this concept.

EXAMPLE 2

Consider a hunter using a rifle in caliber .300 Winchster Magnum with 180 grain bullets. The nominal bullet trajectory for a rifle in this caliber sighted-in at 100 yards is shown in FIG. 6. This plot shows the bullet drop measured in minutes of angle (MOA) at distances from 100 to 500 yards.

Consider further, that the rifle is equipped with a zoom telescopic sight with minimum magnification of 4× and maximum magnification of 8×. We furnish this riflescope with an offset reticle in the eyepiece focal plane such that at the lowest magnification, the point of aim corresponds to a field angle of 20 MOA. From (1), it follows that this scope can provide 10 MOA of adjustment when the magnification is increased to 8× ($\beta=20$, $z=8$, and $z_{min}=4$; so $\alpha=10$). The trajectory plot in FIG. 6 shows that this amount of adjustment is enough to compensate for bullet drop of the hunter's .300 Winchster Magnum rifle up to 500 yards.

The hunter can set his riflescope's zoom to the minimum 4× and zero-in his rifle at 100 yards. He can then use his riflescope's zoom knob to increase magnification and simultaneously adjust his point of aim for targets beyond 100 yards. The plot in FIG. 7 shows how the riflescope's zoom adjusts the point of aim for distances between 100 to 500 yards.

B. First Embodiment of the Invention

A first embodiment of the invention is shown in FIGS. 8, 9, 12 and 13. With reference to FIG. 8, a telescopic sight includes an objective lens 1 which forms a first image of the target on the objective focal plane 2. The first image produced by the objective lens is upside down and laterally reversed. An image-erecting means comprising a pair of lenses 3a and 3b relays this first image to the eyepiece focal plane 4 and forms a second, upright and laterally correct image there. An eyepiece lens 5 takes this second image and produces a virtual magnified image for the shooter to see.

The lenses 3a and 3b have a common optical axis 50 and are movable along this axis. These lenses form the variator group and provide the scope with zoom capability.

A reticle 20 is mounted at the eyepiece focal plane 4. The reticle has an aiming center which is the point or mark used to designate the point of aim. The aiming center is often located where the cross-hairs meet but it can also be marked by a point, an illuminated circle or similar indicia. With reference to FIG. 8, the reticle 20 is mounted such that its aiming center (located on the axis 51) is positioned at a pre-determined offset $\delta$ above the optical axis 50 of the variator group lenses. The procedure for calculating $\delta$ is as follows:

i) Specify the amount of angular bullet drop compensation a needed for the caliber/bullet being used.

The value for $\alpha$ in minutes of angle can be obtained using ballistic tables available for various calibers.

ii) Given a and the scope's minimum and maximum zoom settings, use (1) to calculate $\beta$.

iii) Choose a suitable reticle offset $\delta$ such that at lowest magnification, the reticle's point of aim is $\beta$ minutes of angle above the center of the scope's field of view.

The exact relation between the field angle $\beta$ and the reticle offset $\delta$ depends on the the focal length of the objective lens and the magnification factor of the image-errecting/variator group. Persons skilled in the art of designing telescopic gun sights would be familiar with choosing a proper value for the offset $\delta$ such that at the lowest magnification, the reticle's point of aim would correspond to a field angle $\beta$ above the center of field of view.

With reference to FIG. 9, the telescopic sight is further equipped with a zoom knob 31 which is located near the rear end of the scope's main housing 30. This knob is manually rotatable by the shooter. It is connected via a suitable mechanical linkage means to the variator group lenses 3a and 3b such that it can move these lenses along their optical axis 50. The shooter can change the sight's magnification by rotating the zoom knob 31.

The zoom knob 31 may be furnished with markings representing distance to the target as shown in FIG. 12. The distance markings are placed such that by turning the zoom knob to a specific distance, the sight will provide the proper amount of bullet drop compensation for that distance. The zoom knob may also be furnished with markings representing actual amounts of bullet drop compensation in MOA or in milliradians provided at each magnification. This option is illustrated in FIG. 13.

To use the telescopic sight described in this embodiment, an operator (shooter) can set the riflescope's magnification to the minimum zoom and zero-in his rifle at a known distance, say 100 yards. He can then use his riflescope's zoom knob to increase magnification and simultaneously adjust his point of aim for targets beyond 100 yards.

C. Second Embodiment of the Invention

A second embodiment of the invention is shown in FIGS. 10, 11, 12 and 13. This embodiment is identical to the first embodiment described above except that the eyepiece lens 5 is mounted at an offset $\delta$ (same as the reticle's offset) with respect to the optical axis 50 of the variator lens group. In this embodiment the optical axis of the eyepiece lens is aligned with the aiming center of the reticle. This makes the reticle appear at the center of field of view. This feature could be appealing when the vertical offset $\delta$ is large.

D. Advantages

Based on the above descriptions of the invention, a number of advantages over prior art are readily apparent:

1. The zoom feature of the riflescope is used to provide increased magnification and bullet drop compensation at the same time. This makes aiming at targets at long distance very easy and straightforward.
2. The elevation and windage adjustment range provided by the mechanical methods used in conventional telescopic sights become dependent near their maxima and minima. This is because of the cylindrical shape of the main housing tube used in telescopic sights. In the present invention, the conventional elevation adjustment mechanism is only used for zeroing-in the sight. Additional adjustment for bullet drop is provided optically. Therefore, mechanical elevation adjustment is kept at a minimum which, in turn, makes the interference with windage unlikely.
3. The invention is very easy to implement. It requires little optical design and can be retrofitted in existing riflescopes.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Figure 1:
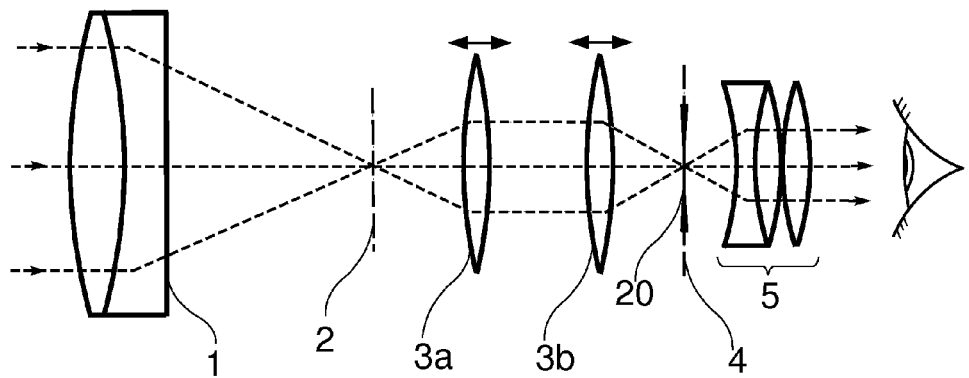
FIG. 1 is a side view schematic depicting the optical layout of a zoom telescopic sight.
Figure 2:
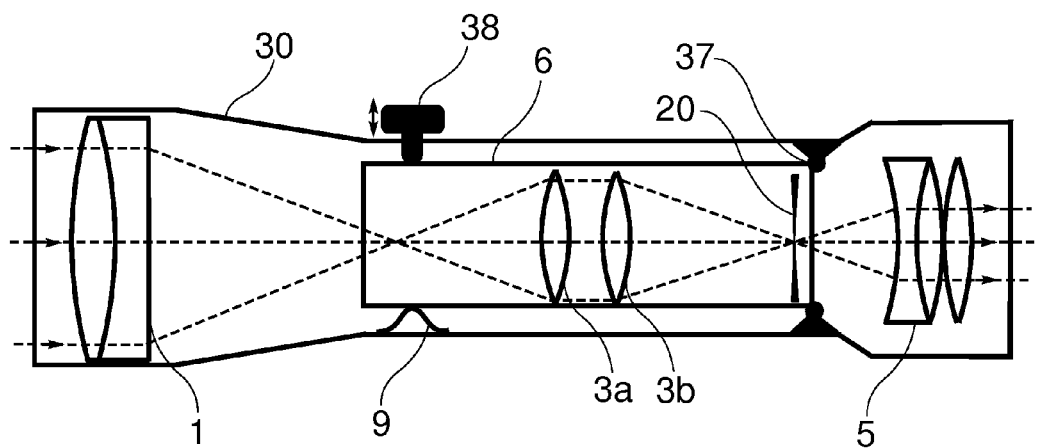
FIG. 2 is a side view schematic depicting the mechanical elevation adjustment mechanism in a telescopic sight.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:

1. For simplicity and brevity, we discussed and illustrated the concept of ballistic zoom with reference to the simplified optical diagrams shown in FIGS. 3, 8 and 10. It is understood that the offset reticle concept can work separately or in combination with mechanical elevation and windage adjustment mechanisms such as the one shown in FIG. 2.
2. It is also possible to adapt the ballistic zoom solution described in the present invention to a riflescope that uses optical elevation adjustment (see, e.g. U.S. Pat. No. 8,749,887 issued to the present applicant).

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A zoom telescopic sight for designating a weapon's point of aim when pointed at a target, comprising:
    a. an objective lens for forming a first image of the target,
    b. an image-erecting means for converting said first image into an upright and laterally-correct second image of the target, said image-erecting means having an optical axis, said image-erecting means being positioned after said objective, said image erecting means comprising two or more lens elements, said lens elements being positioned on said optical axis, said lens elements being movable along said optical axis,
    c. an eyepiece lens for converting said second image into a virtual third image of the target for convenient viewing by an operator, said eyepiece lens having an optical axis, said eyepiece lens providing a field of view, said eyepiece lens being positioned after said image erecting means, d. a reticle for indicating the point of aim, said reticle having an aiming center, said reticle being positioned coplanar with said second image of the target, wherein the improvement comprises e. said reticle being positioned such that its aiming center has a predetermined vertical offset with respect to the optical axis of the image-erecting means, whereby the operator can view and use said third image of the target for the purpose of aiming and adjust his point of aim for bullet trajectory by moving the image-erecting means lens elements along said common optical axis.

2. The telescopic sight of claim 1 further including a knob, said knob being
   a. manually rotatable by the operator,
   b. connected to the image-erecting-means lens elements via a suitable mechanical linkage means, and
   c. furnished with markings representing bullet drop measured in minutes of angle or milliradian, whereby the operator can adjust his point of aim in the vertical direction by rotating said knob to a suitable bullet drop marking.

3. The telescopic sight of claim 1 further including a knob, said knob being
   a. manually rotatable by the operator,
   b. connected to the image-erecting-means lens elements via a suitable mechanical linkage means, and
   c. furnished with markings representing distance to the target whereby the operator can adjust his point of aim for various distances by rotating said knob to a suitable distance marking.

4. The telescopic sight of claim 1 wherein the optical axis of the eyepiece lens has a predetermined vertical offset with respect to the optical axis of the image-erecting means such that the reticle aiming center appears at the center of field of view.

5. The telescopic sight of claim 2 wherein the optical axis of the eyepiece lens has a predetermined vertical offset with respect to the optical axis of the image-erecting means such that the reticle aiming center appears at the center of field of view.

6. The telescopic sight of claim 3 wherein the optical axis of the eyepiece lens has a predetermined vertical offset with respect to the optical axis of the image-erecting means such that the reticle aiming center appears at the center of field of view.

\* \* \* \* \*